Jan. 4, 1938. E. V. MURPHREE ET AL 2,104,401
PROCESS FOR SOLVENT TREATING OILS AND RECOVERING SOLVENT
Filed July 14, 1934
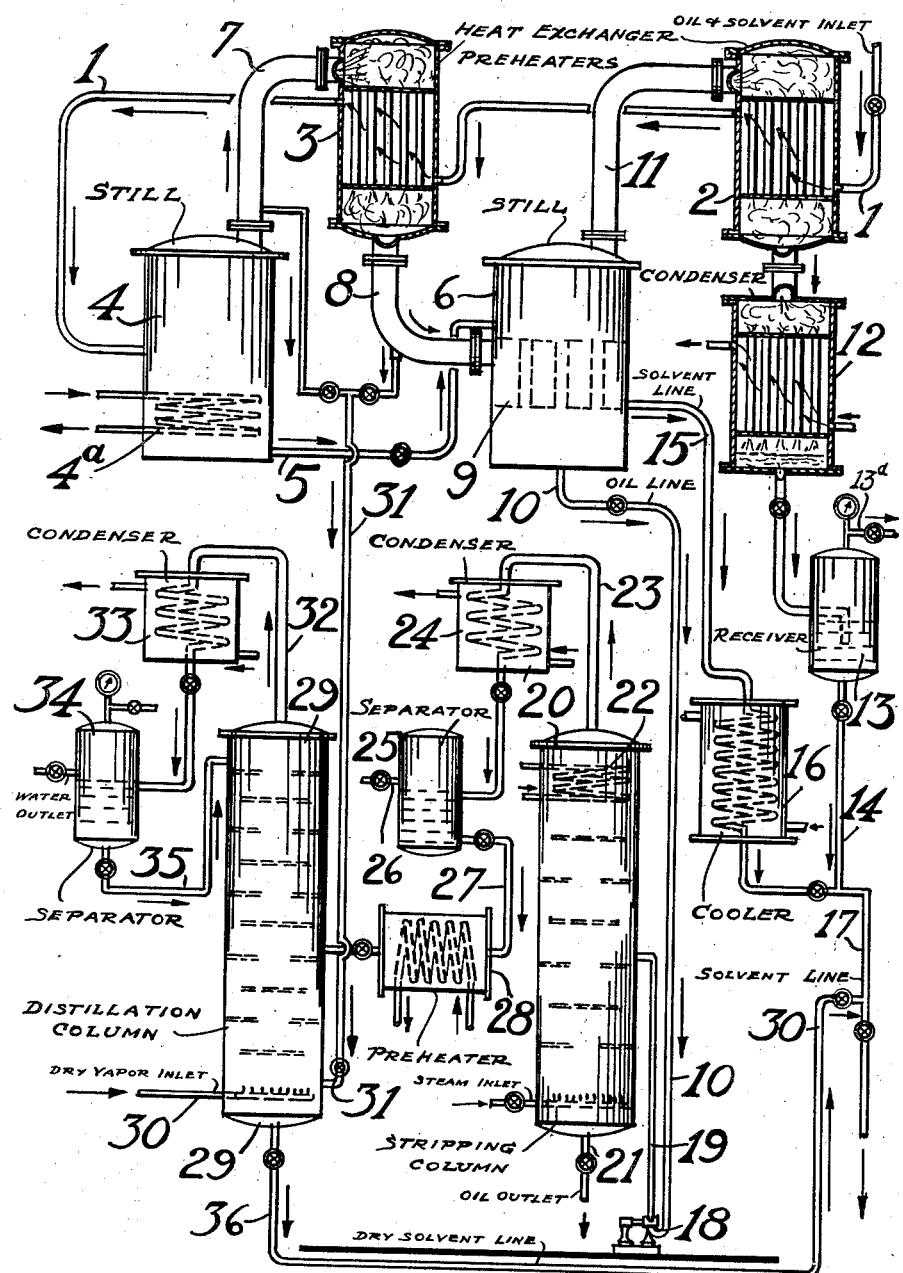
Eger V. Murphree
Edward D. Reeves Inventors
By W. E. Currie Attorney Patented Jan. 4, 1938

2,104,401

UNITED STATES PATENT OFFICE 2,104,401

PROCESS FOR SOLVENT TREATING OILS AND RECOVERING SOLVENT

Eger V. Murphree and Edward D. Reeves, Baton Rouge, La., assignors to Standard Oil Development Company, a corporation of Delaware Application July 14, 1934, Serial No. 735,142

4 Claims. (Cl. 196—13)

This invention relates to an improved process for treating mineral oils at low temperatures and, more particularly, the treatment of mineral lubricating oils with selective solvents and to the recovery, purification and reuse of such solvents.

It is essential in the treatment of hydrocarbon oils with water immiscible selective solvents at temperatures below about 0° C. to work under substantially anhydrous operating conditions both as to the oil treated and the solvents used. It is desirable also to use relatively low temperatures in the separation of the solvent from the treated oils, both for purposes of economy and to avoid decomposition of the solvent and degradation in the quality of the oil fractions obtained. There has now been devised an improved process whereby such disadvantages are avoided and which permits the recovery and reuse of an anhydrous solvent in a simple and effective manner. The process will be described in relation to the accompanying drawing, which is a diagrammatic sketch in sectional elevation of an apparatus adapted to carry out one modification of this process and illustrates the flow of materials.

Referring to the drawing, a solvent extract of a treated oil, for example, the solvent-oil mixture obtained on dewaxing a waxy lubricating oil by cooling a mixture thereof with a water immiscible solvent consisting of chlorinated hydrocarbons of 1 to 4 carbon atoms, is passed by line 1 through heat exchanger preheaters 2 and 3 into still 4. This still is the first of a series of multiple effect evaporators and may be operated at elevated, atmospheric or sub-atmospheric pressure as desired. It is preferably operated at or near atmospheric pressure when using halogenated hydrocarbon solvents. The still may be heated by circulation of a heating fluid, such as steam under pressure, through coil 4a or it may be direct fired or the incoming oil stream may be first passed through a preheater (not shown). Any combination of such heating methods may also be used as will be understood. The liquid passes from still 4 through line 5 into still 6, the second evaporator effect, which is operated at a lower pressure than the first effect according to the usual practice in multiple effect evaporation. The vapors from still 4 pass by line 7 through heat exchanger 3 in indirect heat exchange to the incoming feed and then pass by line 8 into the heating chamber 9 of still 6, where it is condensed with liberation of heat to the liquid boiling within the still. The oil, now freed of 80 to 90 or 95% or even more of the solvent is withdrawn from still 6 through line 10 and passes to the stripping system to be described later. The vapors from still 6 pass through line 11, through heat exchanger 2 and condenser 12 to receiver 13, on which a vacuum is drawn by any suitable means through line 13a. The solvent withdrawn from chamber 9 of still 6 by line 15 through cooler 16 is passed, together with solvent withdrawn from receiver 13 through line 14, by means of gravity or suitable pumps to a suitable storage (not shown) by line 17.

It will be obvious that this distillation to separate the solvent from the oil can be conducted as desired in any number of effects, for example, in a triple or quadruple effect system. The solvent may also be separated from the oil in a single still operated at any desired pressure which may be uniform throughout the distillation. It is, however, preferable to conduct the distillation at a progressively decreasing pressure in order to avoid the necessity of heating the oil to a high temperature.

The oil withdrawn through line 10 and containing a minor proportion of solvent is passed by pump 18 and line 19 into a stripping column 20 in which it is passed counter-current to any suitable vapor, such as steam, for the purpose of removing the last traces of solvent therefrom. The stripped oil is withdrawn through line 21 and may be cooled and passed to storage or subjected to any additional desired treatment. The oil admitted to the stripping column may be preheated in line 19, if at a temperature below that desired, or the column may be heated by any suitable means, or both types of heating may be employed. If the column is operated at a sufficiently high temperature to volatilize fractions of the oil, a reflux cooler 22 may be placed in the top of the column. This column may also be operated under vacuum.

The distillate passes from column 20 through line 23 and condenser 24 to separator 25 in which the condensed steam and the solvent form separate layers. The water layer is withdrawn through line 26 and may be subjected to any suitable treatment for recovery of any solvent dissolved therein.

The solvent layer formed in separator 25 contains an appreciable amount of dissolved water which is ordinarily sufficient to cause difficulties due to the formation of ice on the use of this solvent at temperatures below the freezing point of water. This wet solvent is passed through suitable preheater 28 into distillation column 29 and passes down this column counter-current to a rising stream of dry vapor which may be obtained by boiling the solvent in the bottom of the column or may be admitted from any external source through line 30. Any gas which remains uncondensed at the condensing temperature of the distillate may be used, for example, air, nitrogen, methane and the like are suitable and are preferably supplied to the column in a preheated condition. A particularly advantageous method is to operate the distillation column 29 at a pressure lower than that used in still 4 and to remove a fraction of the vapors from lines 7 or 8 and to pass these vapors by line 31 into the bottom of column 29.

The distillate from column 29 passes through line 32 and condenser 33 into separator 34 where an upper layer of water separates from a lower layer of solvent saturated with water. The water and any uncondensed gases are withdrawn from this separator and may be subjected, if desired with the addition of water from line 26, to any suitable treatment for the recovery of solvent, which may be returned to column 29. The wet solvent from separator 34 is returned as reflux to column 29 by line 35. A substantially anhydrous solvent is withdrawn from the bottom of this column through line 36 and may be added to the solvent in line 17 and reused for the treatment of additional oil.

Similar methods may be used for the recovery of solvent from the waxy mixture separated on dewaxing. This method may also be applied to the recovery of solvent from any one or more of the phases obtained on treating oils generally with selective solvents of lower boiling point than the oil. The wet solvent resulting from a steam stripping distillation of the separate phases may be combined and passed to a single dehydrating step, such as the dehydrating distillation described herein.

When using the chlorinated solvents, care should be taken to avoid decomposition of the solvents and corrosion of the dewaxing and solvent recovery equipment insofar as possible. Both are accelerated by the presence of water. It is accordingly desirable to use substantially anhydrous solvents and feed stocks and to avoid the admission of moisture into the system. Where the presence of water is considered desirable for other purposes, as in stripping the last traces of solvent from the treated oil fractions and in the subsequent recovery of solvent from the steam still condensate, those parts of the system coming in contact with the chlorinated solvents and water are preferably made of or lined with metal immune to such corrosion, or which corrode to a much lower extent than does iron under the same conditions. Among such metals are copper, admiralty metal and the low zinc content brasses. For example, in order to minimize corrosion in the equipment illustrated in the attached drawing, the stripping column and all equipment thence to the bottom outlet of the distillation column, including the condenser, separator, preheater and connecting lines, wherever coming into contact with both chlorinated solvent and water, should be made of or lined with a suitable corrosion resistant metal.

The solvent used may be rendered anhydrous by the distillation process described herein, or by any other suitable methods. The oils to be dewaxed are also preferably freed of water by distillation, by blowing with air or inert gases with or without heating, and/or by other physical and chemical means such as treating with adsorbents and sulfuric acid.

The following example is presented to illustrate a suitable method for conducting this process with an apparatus of the type shown in the drawing.

A waxy petroleum lubricating oil of 120° F. pour point is mixed with three parts of a solvent consisting of 25% carbon tetrachloride and 75% ethylene dichloride. This mixture is chilled to about −20° F. and the wax precipitating therefrom is separated by any suitable means, for example, by filtration, centrifugal filtration or centrifugal separation. The resulting oil-solvent solution is warmed up to atmospheric temperature, say 70° F., and is passed through suitable preheaters into the first still of a double effect evaporator. This still is so operated to maintain a pressure of 15 pounds per sq. inch gauge and a boiling temperature of the liquid of 250° F. The liquid withdrawn from the first effect passes into a second effect maintained at a pressure of about atmospheric to 100 mm. of mercury vacuum in which it boils at about 180° F. The oil withdrawn from the second effect contains 5% by volume of solvent, which is removed by stripping with steam. Wet solvent is separated from the condensed steam still distillate and is dried by distilling out the water in a reflux column in which the water and a portion of the solvent are withdrawn as distillate, the distilled solvent being returned as reflux after separation from excess water and an anhydrous solvent being obtained as the distillation residue. The recovered solvent may be mixed with the condensed vapors from the evaporators and may be recycled to the dewaxing operation. The oil recovered from the steam stripper is further refined by acid and clay treating and shows a pour point of 0° F.

The above described distillation method for drying the solvent has the unusual feature that the solvent, which has a boiling point below that of water, is obtained as distillation residue while the less volatile water is removed overhead as distillate. This method of separating water may be used with any organic liquid which is immiscible with water at temperatures below the boiling point of the liquid and which have boiling points above 0° C. It is particularly effective for drying liquids which boil above about 40 to 50° C. Among such liquids are the halogenated hydrocarbons of 1 to 4 or 5 carbon atoms, which are especially suited for the solvent extraction and dewaxing of petroleum oils. As examples of such solvents may be mentioned chloroform, carbon tetrachloride, dichlorethane, dichlorpropane, ethylene dichloride, propylene dichloride, ethylene tetrachloride and the like. Mixtures of such solvents and mixtures of such solvents with hydrocarbon solvents, such as petroleum ether, may also be dried by this process.

This invention is not to be limited to any specific drawing or examples which have been presented herein solely for purpose of illustration, nor to any theoretical explanations of the herein disclosed process, but is to be limited only by the following claims in which it is desired to claim all novelty insofar as the prior art permits.

We claim:

1. In a process for treating mineral lubricating oil with a solvent which is substantially immiscible with and has a lower boiling point than water, the said treatment being carried out at temperatures below the freezing point of water, the improved method of recovering solvent substantially free from water which comprises distilling the major portion of the solvent from the oil, then steam stripping the distillation residue to recover the remaining solvent, retaining the second distillate separate from the first, condensing the second distillate obtained from the steam stripping, separating the solvent layer from the water layer, passing the solvent layer which still contains some water into a stripping column, introducing a dry gas into the said stripping column and stripping the solvent therewith, removing vapors of solvent and water from the top of the column, removing residue consisting of substantially dry solvent from the bottom of the column, and combining the so obtained dry solvent with the solvent first obtained by distillation without steam.

2. Process according to claim 1 in which the vapors removed from the top of the stripping column are condensed, the water layer is removed and the solvent layer is returned to the stripping column.

3. In the process for recovering solvent from a solvent oil mixture wherein the mixture is initially distilled to remove a major portion of the solvent and the distilled residue subjected to steam distillation to remove the remaining portion of the solvent and wherein the solvent employed is immiscible in water and has a boiling point below that of water, the improvement which comprises initially separating the water and wet solvent from the steam distillate, passing the wet solvent in countercurrent contact with a dry gas in a distilling column, removing from the top portion of the distilling column a vapor fraction containing relatively more water than that contained in the wet solvent, condensing said vapors to form a condensate, separating said condensate into a water fraction and water saturated solvent fraction and returning said water saturated solvent fraction to the distilling column whereby the water saturated solvent separated from the steam distillate is dehydrated.

4. In the process for recovering solvent from a solvent oil mixture wherein the mixture is initially distilled to remove a major portion of the solvent and the distilled residue subjected to steam distillation to remove the remaining portion of the solvent and wherein the solvent employed is immiscible in water and has a boiling point below that of water, the improvement which comprises initially separating the water and wet solvent from the steam distillate, passing the wet solvent into a distilling zone and subjecting it to distillation to thereby vaporize a fraction containing relatively more water than said wet solvent, removing vapors from said distilling zone to form a condensate, separating the condensate into a water fraction and a water saturated solvent fraction and returning said saturated water fraction to the distilling zone.

EGER V. MURPHREE.
EDWARD D. REEVES.